United States Patent
Chang et al.

(10) Patent No.: US 8,072,450 B2
(45) Date of Patent: Dec. 6, 2011

(54) SYSTEM AND METHOD FOR MEASURING A THREE-DIMENSIONAL OBJECT

(75) Inventors: Chih-Kuang Chang, Taipei Hsien (TW); Xin-Yuan Wu, Shenzhen (CN); Min Wang, Shenzhen (CN); Hua Huang, Shenzhen (CN); Xiao-Chao Sun, Shenzhen (CN); Shao-Qin Xie, Shenzhen (CN); Jin-Bo Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 662 days.

(21) Appl. No.: 12/233,543

(22) Filed: Sep. 18, 2008

(65) Prior Publication Data

US 2009/0160852 A1    Jun. 25, 2009

(30) Foreign Application Priority Data

Dec. 19, 2007    (CN) .......................... 2007 1 0203240

(51) Int. Cl.
*G06T 15/00* (2011.01)
*G01B 7/00* (2006.01)
*G06K 9/00* (2006.01)

(52) U.S. Cl. .......................... 345/419; 702/155; 382/141

(58) Field of Classification Search .................. 382/141, 382/275–276; 702/150, 155; 345/419
See application file for complete search history.

(56) References Cited

U.S. PATENT DOCUMENTS

| 5,442,572 A * | 8/1995 | Kiridena et al. .............. 382/141 |
| 5,546,328 A * | 8/1996 | Kiridena et al. .............. 700/279 |
| 2004/0254758 A1 * | 12/2004 | Chang .......................... 702/155 |

* cited by examiner

*Primary Examiner* — Xiao M. Wu
*Assistant Examiner* — Yingchun He
(74) *Attorney, Agent, or Firm* — Altis Law Group, Inc.

(57) ABSTRACT

A system for measuring a three-dimensional object is provided. The system measures differences between a 3D model of an object and a point cloud of the object, and highlights the differences on the 3D model using different colors according to difference ranges that the differences fall.

16 Claims, 9 Drawing Sheets

SYSTEM AND METHOD FOR MEASURING A THREE-DIMENSIONAL OBJECT

BACKGROUND

1. Technical Field

Embodiments of the present disclosure generally relate to computer aided design (CAD) systems and methods, and more particularly to a system and method for measuring a three-dimensional (3D) object.

2. Description of Related Art

Generally, before manufacturing an object, a 3D model of the object is first drawn using a CAD model. The object is then manufactured according to the 3D model.

However, due to manufacturing factors, the manufactured object may not be exactly the same as the 3D model for the manufactured object may have errors. What is needed, therefore, is a system and method for measuring the manufactured object, so as to determine a precision of the manufactured object.

SUMMARY

A system for measuring a 3D object is provided. The system includes a scanning module, a processing module, a reading module, an adjusting module, an aligning module, a contrasting module, and at least one processor. The scanning module is configured for controlling a laser scanning device to scan all surfaces of an object for obtaining a point cloud of each of the surfaces. The processing module is configured for processing the point clouds so as to obtain an integrated point cloud of the object. The reading module is configured for reading a 3D model of the object from a database system. The adjusting module is configured for adjusting normal vectors of surfaces of the 3D model for making the normal of all the surfaces of the 3D model have the same orientation. The aligning module is configured for aligning the integrated point cloud with the 3D model. The contrasting module is configured for contrasting the integrated point cloud and the 3D model, and highlighting differences between the integrated point cloud and the 3D model by assigning different colors on the 3D model. At least one processor is configured for executing the scanning module, the processing module, the reading module, the adjusting module, the aligning module, and the contrasting module.

Other advantages and novel features of the present invention will become more apparent from the following detailed description of preferred embodiment when taken in conjunction with the accompanying drawings, in which:

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Figure 1:
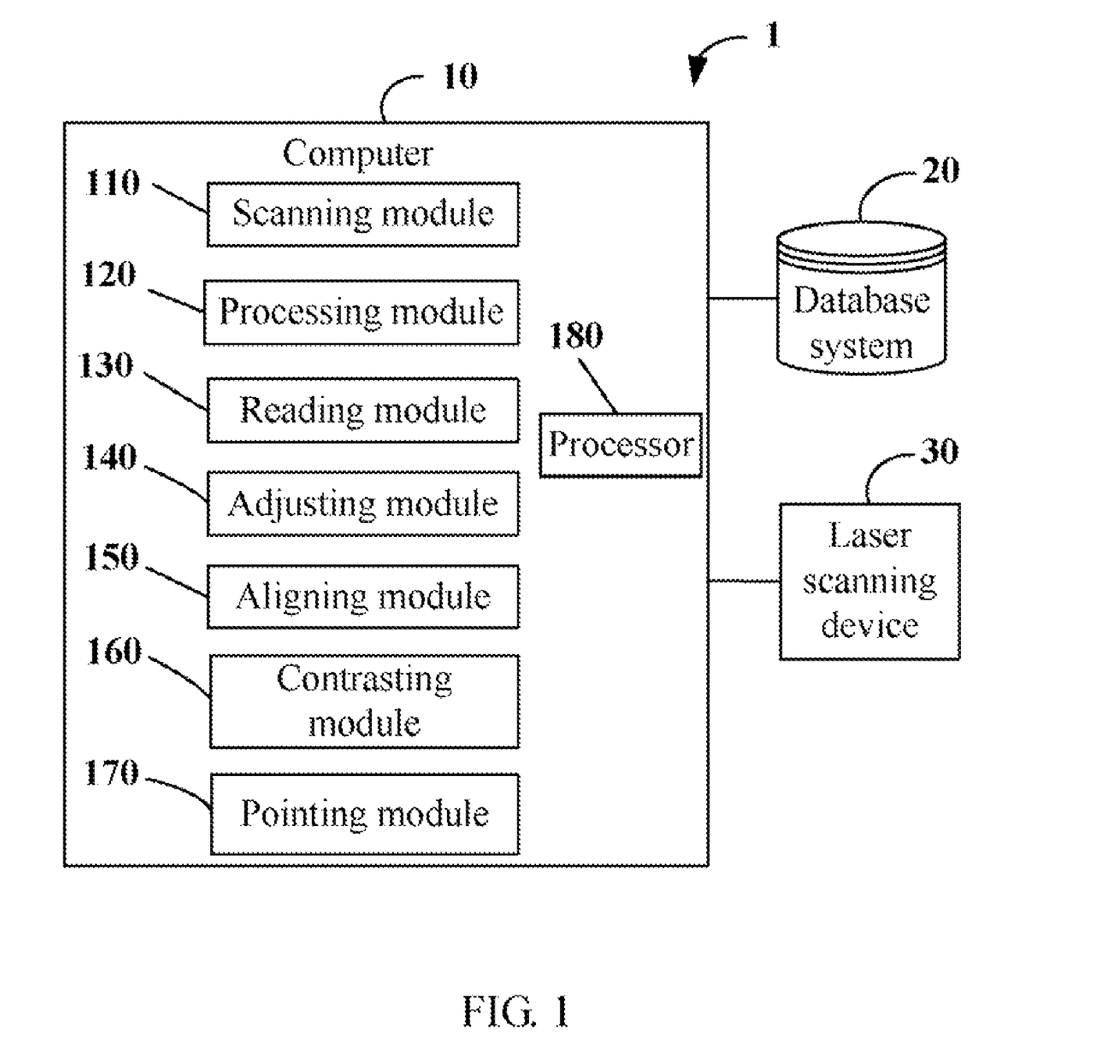
FIG. 1 is a block diagram of one embodiment of a system for measuring a 3D object.

FIG. 1 is a block diagram of one embodiment of a system for measuring a 3D object. In one embodiment, the system 1 may include a computer 10, a database system 20, and a laser scanning device 30. The laser scanning device 30 and the database system 20 electronically connect and communicate with the computer 10. The laser scanning device 30 is configured for scanning an object (not shown) for obtaining a point cloud of each surface of the object. It may be understood that a point cloud is a set of vertices of each surface of an object in a three-dimensional coordinate system. These vertices are usually defined by X, Y and Z coordinates. The laser scanning device 30 measures a large number of points on each surface of the object, and outputs a point cloud of the each surface as a data file. The point cloud represents the visible surface of the object that has been scanned or digitized. The database system 20 stores a 3D model of the object.

The computer 10 includes a plurality of modules that may be used to implement certain functions and will be described in greater detail below. In one embodiment, the computer 10 may include a scanning module 110, a processing module 120, a reading module 130, an adjusting module 140, an aligning module 150, a contrasting module 160, and a pointing module 170. The various modules 110, 120, 130, 140, 150, 160, and 170 may be executed by one or more specialized or general purpose processors, such as a processor 180.

The scanning module 110 is configured for controlling the laser scanning device 30 to scan all the surfaces of the object, so as to obtain a point cloud of each surface.

The processing module 120 is configured for obtaining an integrated point cloud of the object by processing the point clouds of all the surfaces. In one embodiment, the processing module 120 obtains the integrated point cloud using a method as follows. Firstly, the processing module 120 arranges the point clouds together according to an appearance of the object. Secondly, the processing module 120 deletes redundant points from the point clouds. Then, the processing module 120 deletes noise points from the point clouds. Afterwards, the processing module 120 filters the point clouds in order to yield uniformly distributed point clouds. Finally, the processing module 120 integrates the point clouds, so as to generate the integrated point cloud of the object. It will be understood that the redundant points are overlapping points among the point clouds. It will be further understood that the noise points are points not belonging to the object.

In other embodiments, filtering the point clouds may use a method of well-proportioned filtering or a method of curvature filtering. The method of well-proportioned filtering may be realized by regularly deleting points from the point clouds. The method of curvature filtering may be realized by deleting points from a point cloud of a surface according to a curvature of the surface, that is, selectively deleting a large amount of points from a point cloud of a surface if the surface has a small curvature, and selectively deleting a few amount of points from a point cloud of a surface if the surface has a large curvature.

The reading module 130 is configured for reading the 3D model of the object from the database system 20.

Figure 9:
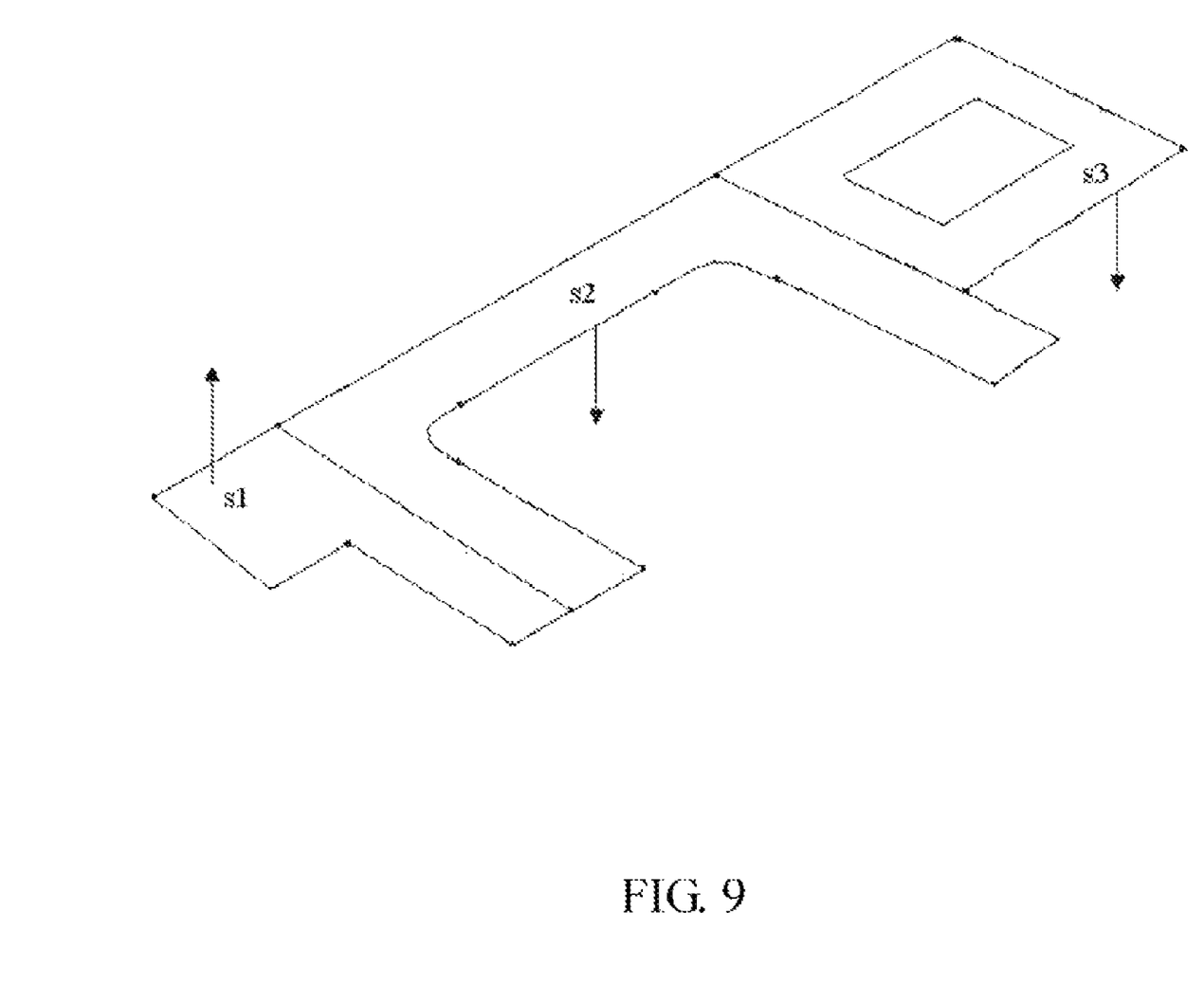
FIG. 9 is a diagram illustrating normal vectors of surfaces.

The 3D model may comprise many surfaces having different orientations and angled along different planes of a 3D coordinate axis system. A vector normal (hereinafter, "the normal vector") to each of these surfaces may be determined by the adjusting module 140. Furthermore, the adjusting module 140 is configured for adjusting normal vectors of each of the surfaces of the 3D model, so as to make all of the normal vectors have the same orientation. It may be understood that, the normal vector of a surface is vector that is perpendicular to a plane tangent to the surface. The normal vectors may be oriented upwards so as to extend in an orientation inside a surface of the 3D model or the normal vectors may be oriented downwards so as to extend in an orientation outside a surface of the 3D model, depending on the 3D model and the embodiment. Referring to FIG. 9, the normal vector of the surface S1 is outside, and the normal vectors of the surfaces S2 and S3 are inside. It may be understood that normal vectors all having the same orientation means all of the normal vectors are inside or outside.

In one embodiment, the adjusting may be automatic or by designating positions manually. In one embodiment, the method of adjusting normal vectors automatically may include determining a base surface from the 3D model and presetting a distance tolerance. Secondly, boundaries of the base surface and other surfaces of the 3D model are determined. Then, intersecting surfaces between the base surface and each of the surfaces of the 3D model are determined according to the distance tolerance and the boundaries. It may be understood that, if a boundary distance between the base surface and a surface of the 3D model is less than the distance tolerance, the surface is the intersecting surface. Afterwards, the intersecting surfaces whose normal vectors are the same as the normal vector of the base surface are selected. Finally, the normal vectors of the selected intersecting surfaces are adjusted.

In one embodiment, the method of adjusting normal vectors by designating positions manually may include determining surfaces whose normal vectors need to be adjusted from the 3D model. Then, the determined surfaces are meshed with a series of triangles. Afterwards, a position on the determined surfaces is designated randomly. Then, an uppermost layer triangle that contains the designated position from the series of triangles is determined. Afterwards, an angle between a vector of the uppermost layer triangle and a current visual angle of a screen of the computer 10 is computed. Then, the surface that contains the uppermost layer triangle if the angle is more than 90 degree is obtained. Finally, the normal vector of the obtained surface is adjusted by reversing points of the boundary of the obtained surface.

The aligning module 150 is configured for aligning the integrated point cloud with the 3D model. In one embodiment, the aligning module 150 aligns the integrated point cloud with the 3D model by superposing a center point of the integrated point cloud and a center of the 3D model by moving the integrated point cloud. Then, several points from the integrated point cloud are determined randomly. After that, an approximate site of the integrated point cloud is computed using an iterative method according to the several points. Then, an accurate site of the integrated point cloud is computed using the iterative method according to the approximate site and all points in the integrated point cloud. Finally, the integrated point cloud is rotated and translated to the accurate site. It may be understood that, the iterative method refers to a wide range of techniques that use successive approximations to obtain more accurate solutions to a linear system at each step. Thus, for reducing a computational work, the approximate site is computed firstly, and then, the accurate site is computed according to the approximate site.

The contrasting module 160 is configured for contrasting the integrated point cloud and the 3D model, and highlighting differences between the integrated point cloud and the 3D model by assigning different colors on the 3D model. In one embodiment, the contrasting module 160 contrasts the integrated point cloud and the 3D model and highlights differences between the integrated point cloud and the 3D model using a method as follows. Firstly, the contrasting module 160 meshes all the surfaces of the 3D model with a series of triangles. Then, the contrasting module 160 computes a difference between each of the points in the integrated point cloud and a corresponding triangle on the surfaces of the 3D model. After that, the contrasting module 160 presets a plurality of difference ranges and presets a unique color for each of the difference ranges. Finally, the contrasting module 160 highlights the triangles using the unique color of a difference range in which the difference of the triangle falls. It may be understood that, the integrated point cloud of the object corresponds to the 3D model of the object, and each point in the integrated point cloud has a corresponding position and a corresponding triangle that contains the corresponding position on the 3D model. In one embodiment, if a triangle of the 3D model has a plurality of corresponding points in the integrated point cloud, the difference of the triangle is an average distance between the triangle and the plurality of corresponding points in the integrated point cloud.

The pointing module 170 is configured for creating a pointer for each position on the 3D model for showing a difference and a color of the each position when the position is designated. A difference of a position is the distance (or average distance) between the triangle that contains the position on the 3D model and the corresponding point (or points) in the integrated point cloud. It may be understood that, the pointer is a programming language data type whose value refers directly to (or "points to") another values (the difference and the color) stored elsewhere in the database system 20 using its address. when a user designates a position on the 3D model using a mouse of the computer 1, the pointer of the position acquires the difference and the color of the position from the database system 20, and shows the difference and the color on the screen of the computer 10.

Figure 2:
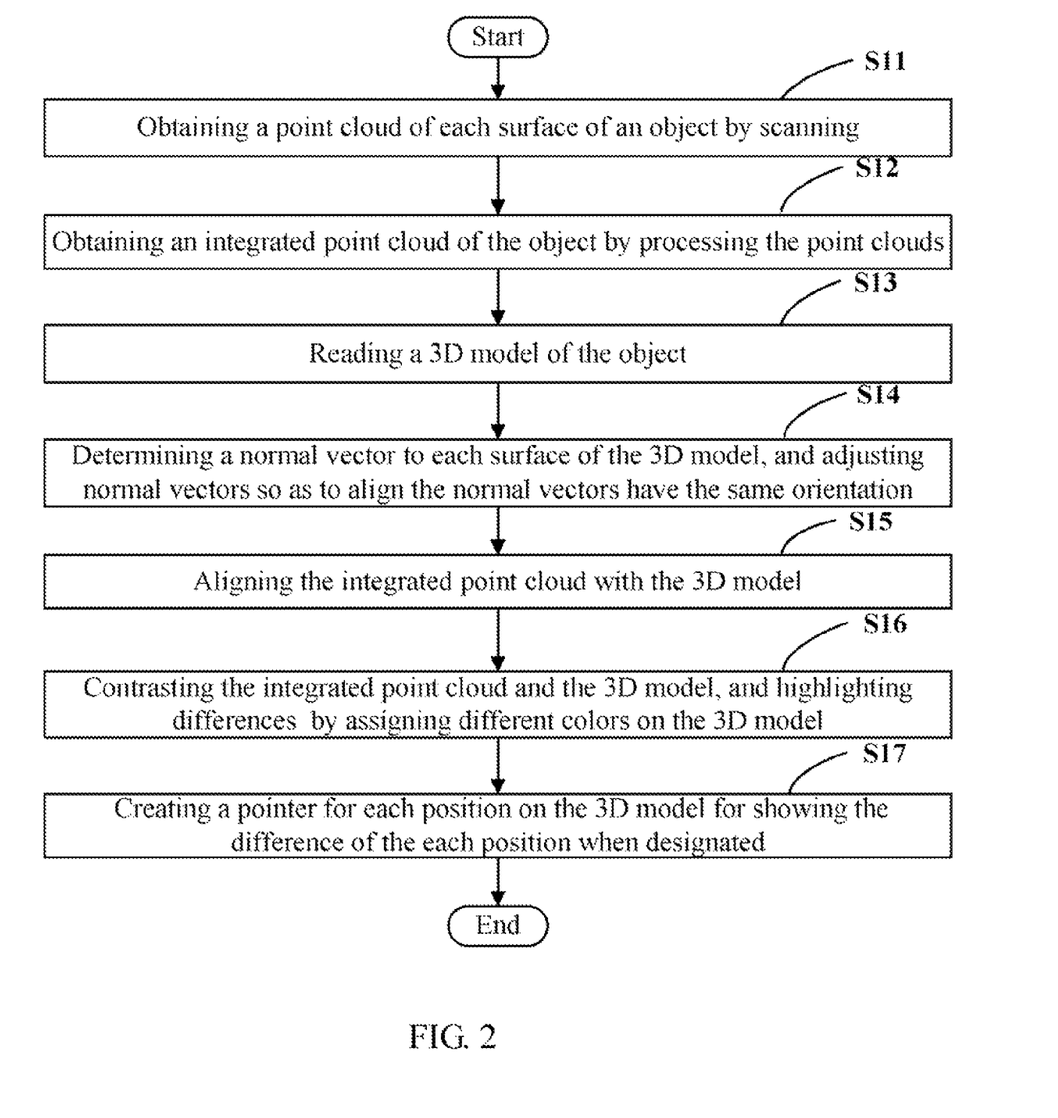
FIG. 2 is a flowchart illustrating one embodiment of a method for measuring a 3D object.

FIG. 2 is a flowchart illustrating one embodiment of a method for measuring a 3D object. Depending on the embodiment, in FIG. 2, additional blocks may be added, others removed, and the ordering of the blocks may be changed.

In block S11, the scanning module 110 controls the laser scanning device 30 to scan all surfaces of an object to obtain a point cloud for each of the surfaces. As mentioned above, the object may be three-dimensional and have many surfaces.

In block S12, the processing module 120 processes the point clouds so as to obtain an integrated point cloud of the object. A detailed description of block S12 is given in FIG. 3.

In block S13, the reading module 130 reads a 3D model of the object from the database system 20.

In block S14, the adjusting module 140 adjusts normal vectors of each of the surfaces of the 3D model so as to align normal vectors of each of the surfaces of the 3D model. As mentioned above, the normal vectors may be inside or outside. The adjusting may be realized by automatically or by designating positions manually. The method of adjusting normal vectors automatically is described in FIG. 4 in detailed, and the method of adjusting normal vectors by designating positions manually is described in FIG. 5 in detailed.

In block S15, the aligning module 150 aligns the integrated point cloud with the 3D model. A detailed description of block S15 is described in FIG. 6.

In block S16, the contrasting module 160 contrasts the integrated point cloud and the 3D model, and highlights differences between the integrated point cloud and the 3D model by assigning different colors on the 3D model. A detailed description of block S16 is given in FIG. 7.

In block S17, the pointing module 170 creates a pointer for each position on the 3D model for showing the difference and the color of the each position when the position is designated. A detailed description of block S17 is given in FIG. 8.

Figure 3:
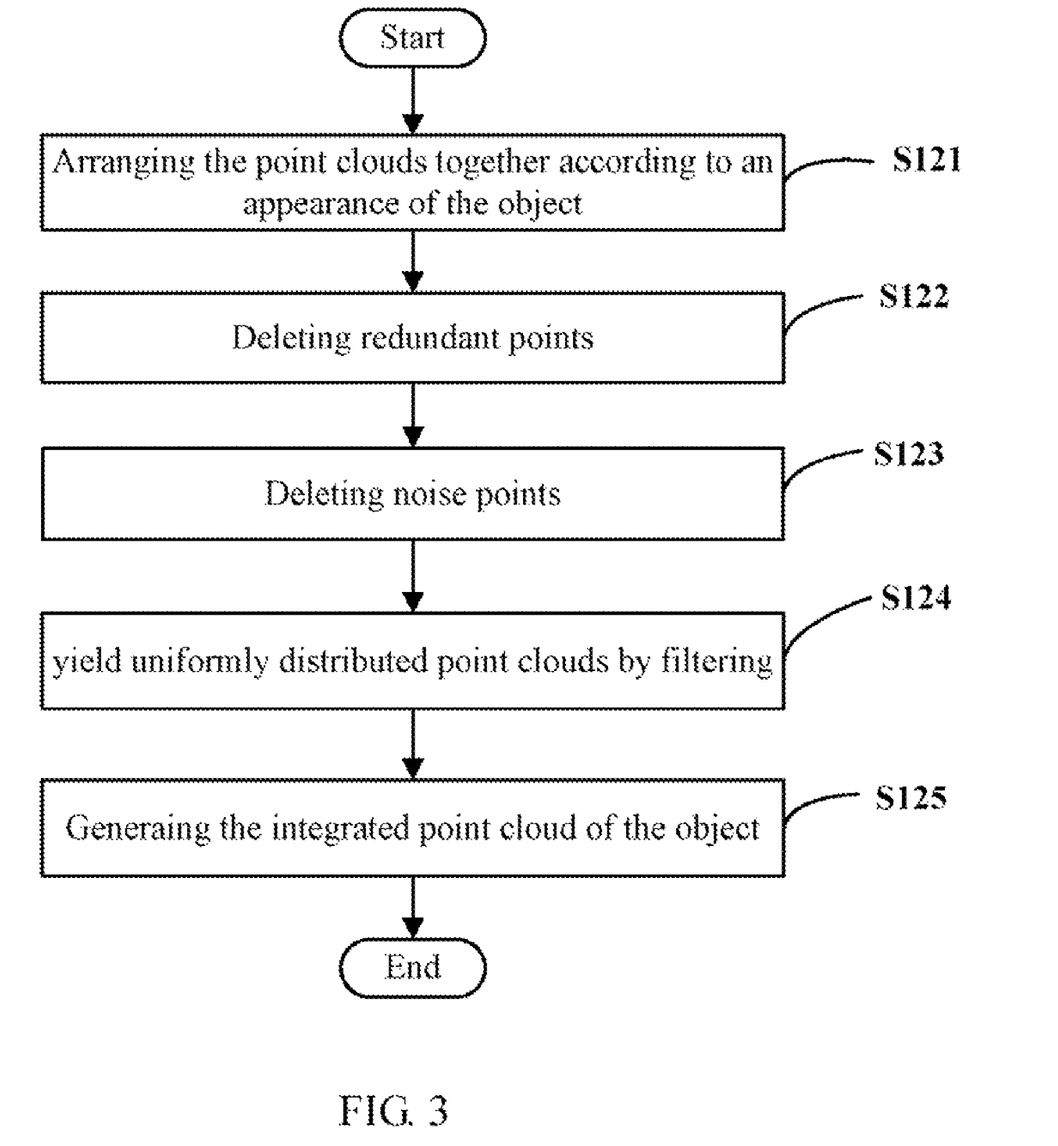
FIG. 3 is a detailed description of one block in FIG. 2 of one embodiment of a method for obtaining an integrated point cloud of the object.

FIG. 3 is a detailed description of block S12 in FIG. 2 of one embodiment of a method for obtaining an integrated point cloud of the object. Depending on the embodiment, in FIG. 3, additional blocks may be added, others removed, and the ordering of the blocks may be changed.

In block S121, the processing module 120 arranges each of the point clouds together according to an appearance of the object.

In block S122, the processing module 120 deletes redundant points from the point clouds. That is, if two points overlap each other, one of them is deleted In block S123, the processing module 120 deletes noise points from the point clouds. As mentioned above, the noise points is points that do not belong to the object.

In block S124, the processing module 120 filters the point clouds to yield uniformly distributed point clouds. As mentioned above, filtering the point clouds may use a method of well-proportioned filtering or a method of curvature filtering. As mentioned above, the method of well-proportioned filtering may be realized by regularly deleting points from the point clouds. The method of curvature filtering may be realized by deleting points from a point cloud of a surface according to a curvature of the surface, that is, selectively deleting a large amount of points from a point cloud of a surface if the surface have a small curvature, and selectively deleting a small amount points from a point cloud of a surface if the surface have a large curvature.

In block S125, the processing module 120 integrates the point clouds for generating the integrated point cloud of the object.

Figure 4:
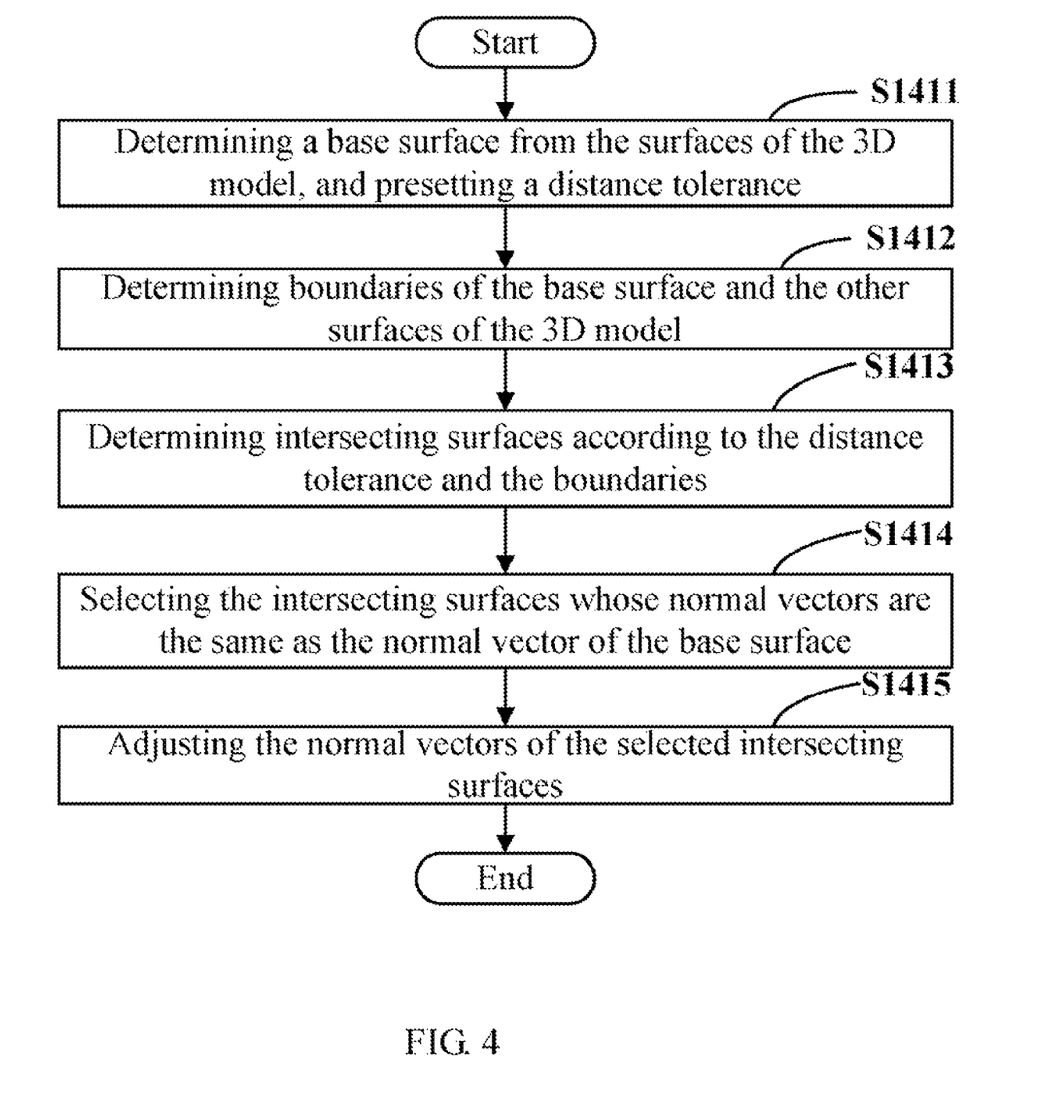
FIG. 4 is a detailed description of another block in FIG. 2 of one embodiment of a method for making normal of surfaces of the 3D model have the same orientation by adjusting normal vectors automatically.

FIG. 4 is a flowchart illustrating one embodiment of a method for adjusting normal vectors automatically. Depending on the embodiment, in FIG. 4, additional blocks may be added, others removed, and the ordering of the blocks may be changed.

In block S1411, the adjusting module 140 determines a base surface from the surfaces of the 3D model and presets a distance tolerance. In one embodiment, the base surface may be determined randomly.

In block S1412, the adjusting module 140 determines boundaries of the base surface and the other surfaces of the 3D model.

In block S1413, the adjusting module 140 determines intersecting surfaces between the base surface and each of the surfaces of the 3D model, according to the distance tolerance and the boundaries. In one embodiment, if a boundary distance between the base surface and a surface of the 3D model is less than the distance tolerance, the surface is the intersecting surface.

In block S1414, the adjusting module 140 selects the intersecting surfaces whose normal vectors are the same as the normal vector of the base surface.

In block S1415, the adjusting module 140 adjusts the normal vectors of the selected intersecting surfaces.

Figure 5:
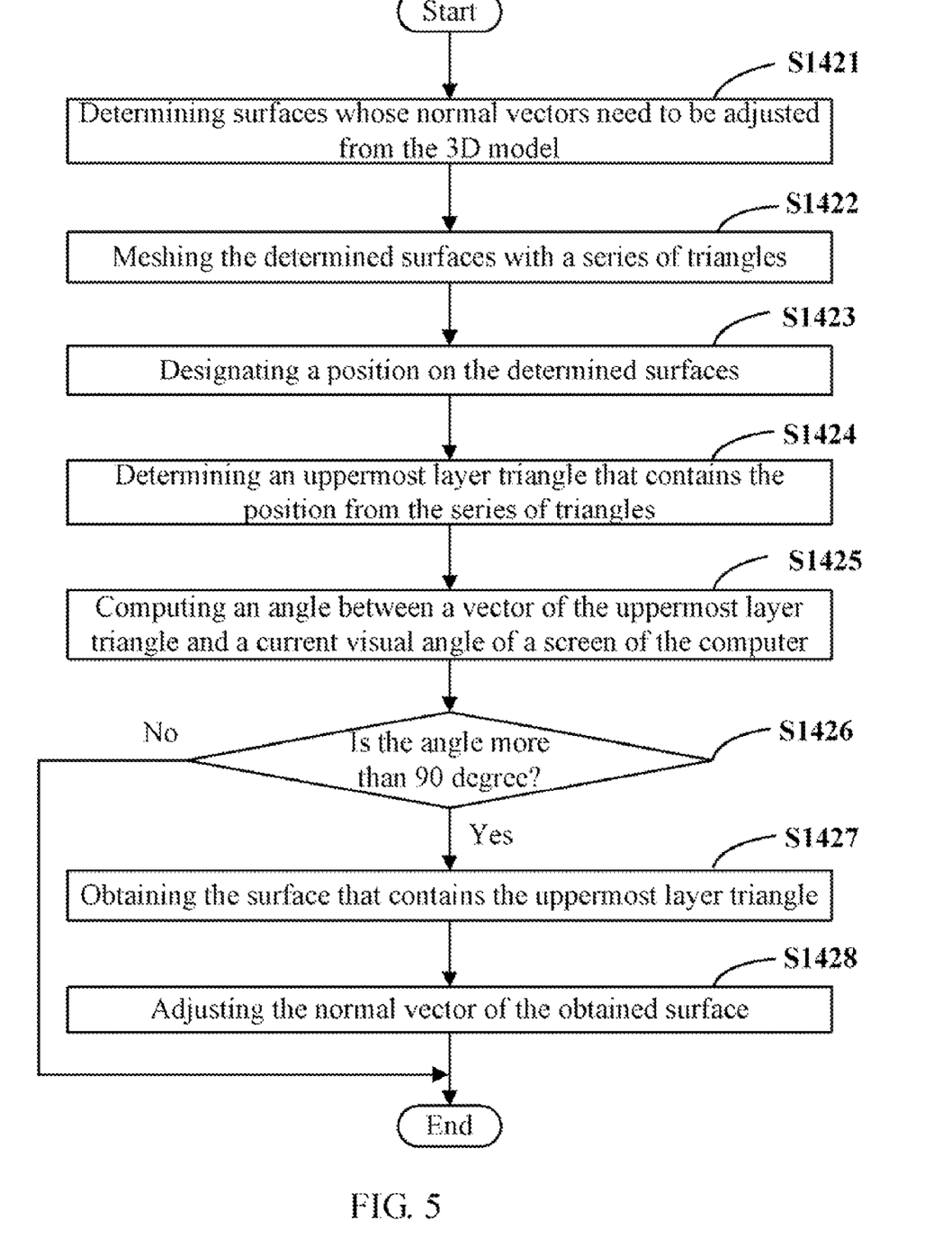
FIG. 5 is a detailed description of the block of FIG. 4 of another embodiment of a method for making normal of surfaces of the 3D model have the same orientation by designating positions.

FIG. 5 is a flowchart illustrating one embodiment of a method for adjusting normal vectors by designating positions manually. Depending on the embodiment, in FIG. 5, additional blocks may be added, others removed, and the ordering of the blocks may be changed.

In block 1421, the adjusting module 140 determines surfaces whose normal vectors need to be adjusted from the surfaces of the 3D model.

In block S1422, the adjusting module 140 meshes the determined surfaces with a series of triangles.

In block S1423, the adjusting module 140 designates a position on the determined surfaces.

In block S1424, the adjusting module 140 determines an uppermost layer triangle that contain the position from the series of triangles.

In block S1425, the adjusting module 140 computes an angle between a vector of the uppermost layer triangle and a current visual angle of a screen of the computer 10.

In block S1426, the adjusting module 140 determines whether the angle is more than 90 degrees. The flow moves to block S1427 if the angle is more than 90 degree. Otherwise, the flow moves to the end if the angle is not more than 90 degree.

In block S1427, the adjusting module 140 obtains the surface that contains the uppermost layer triangle, and in block S1428, the adjusting module 140 adjusts the normal vector of the obtained surface by reversing points of the boundary of the surface that contains the uppermost layer triangle.

Figure 6:
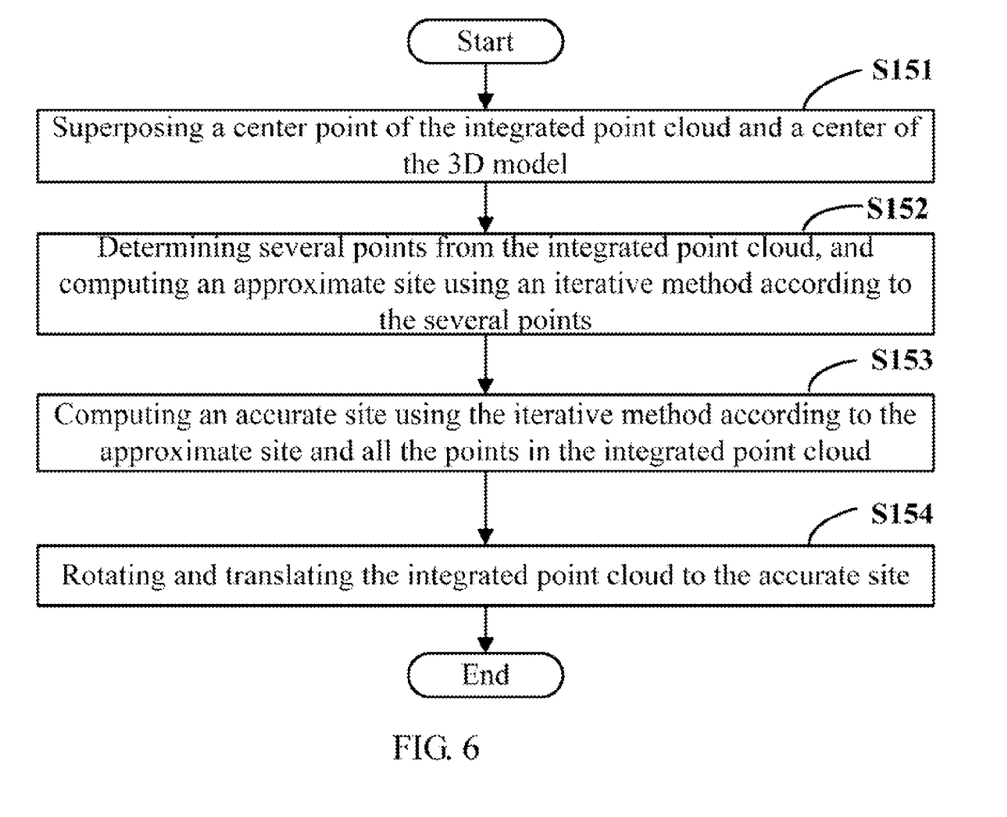
FIG. 6 is a detailed description of another block in FIG. 2 of one embodiment of a method for aligning the integrated point cloud and the 3D model.

FIG. 6 is a detailed description of block S15 in FIG. 2 of one embodiment of a method for aligning the integrated point cloud with the 3D model. Depending on the embodiment, in FIG. 6, additional blocks may be added, others removed, and the ordering of the blocks may be changed.

In block S151, the aligning module 150 superposes a center point of the integrated point cloud with a center of the 3D model by moving the integrated point cloud.

In block S152, the aligning module 150 determines several points in the integrated point cloud, and computes an approximate site using an iterative method according to the several points. In one embodiment, the iterative method is a quasi-newton iterative method. If square sum of distances between the several points in the integrated point cloud and corresponding triangles of the 3D model is smallest, the site of the several points is the approximate site.

In block S153, the aligning module 150 computes an accurate site using the iterative method, according to the approximate site and all points in the integrated point cloud.

In block S154, the aligning module 150 rotates and translates the integrated point cloud to the accurate site.

Figure 7:
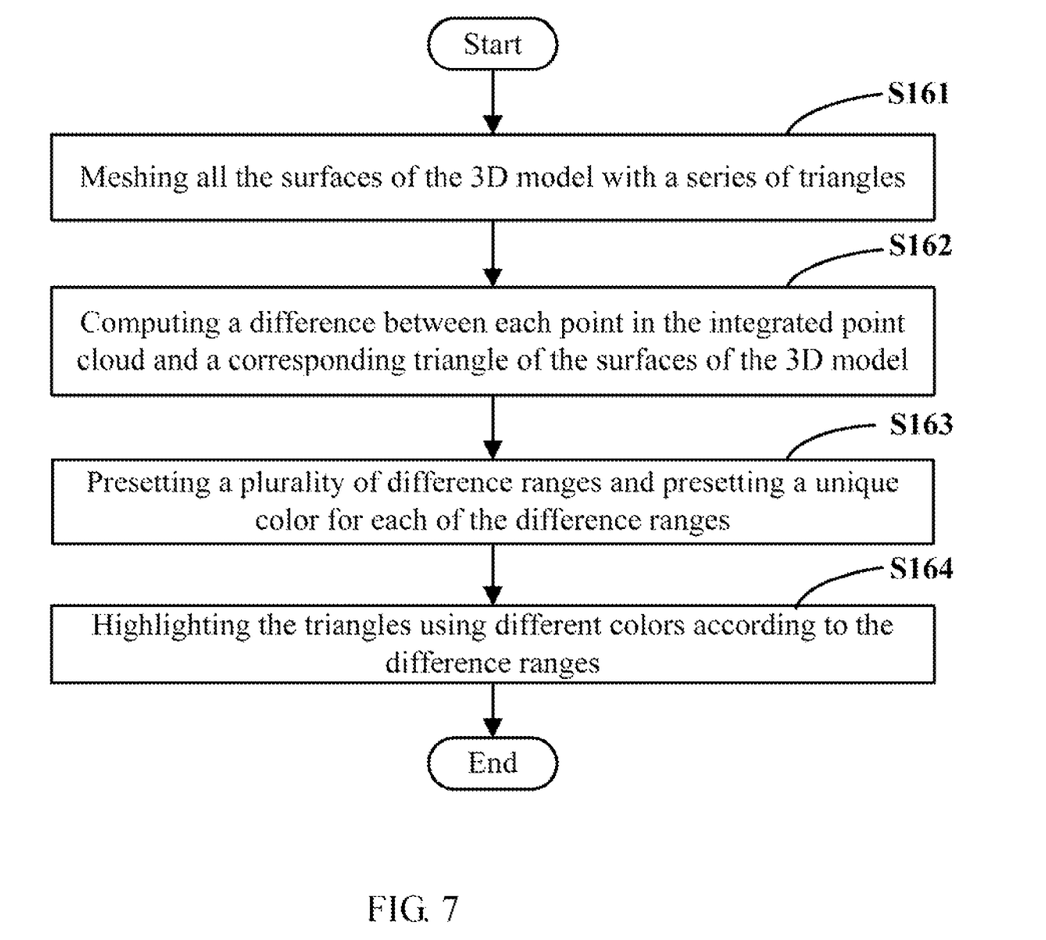
FIG. 7 is a detailed description of another block in FIG. 2 of one embodiment of a method for contrasting and highlighting differences between the integrated point cloud and the 3D model.

FIG. 7 is a detailed description of block S16 in FIG. 2 of one embodiment of a method for contrasting and highlighting differences between the integrated point cloud and the 3D model. Depending on the embodiment, in FIG. 7, additional blocks may be added, others removed, and the ordering of the blocks may be changed.

In block S161, the contrasting module 160 meshes all the surfaces of the 3D model with a series of triangles.

In block S162, the contrasting module 160 computes a difference between each of the points in the integrated point cloud and a corresponding triangle of the surfaces of the 3D model. As mentioned above, the integrated point cloud of the object corresponds to the 3D model of the object, and each point in the integrated point cloud has a corresponding position on the 3D model. Thus, a corresponding triangle contains the corresponding position of the point. In one embodiment, a difference between a point in the integrated point cloud and a corresponding triangle of the surfaces of the 3D model is a distance between the point and the corresponding triangle.

In block S163, the contrasting module 160 presets a plurality of difference ranges and presets a unique color for each of the difference ranges. For example, setting a difference range as 0.1~0.15 and setting a color of the difference range −0.15~−0.1 is yellow, and so on.

In block S164, the contrasting module 160 highlights the triangles according to the differences of the triangles using different colors based on the difference ranges. In one embodiment, if a triangle of the 3D model has a plurality of corresponding points in the integrated point cloud, the difference of the triangle is an average distance between the triangle and the plurality of corresponding points. In an exemplary example, if the difference (average distance) of a triangle is 0.12, the triangle is highlighted to as yellow.

Figure 8:
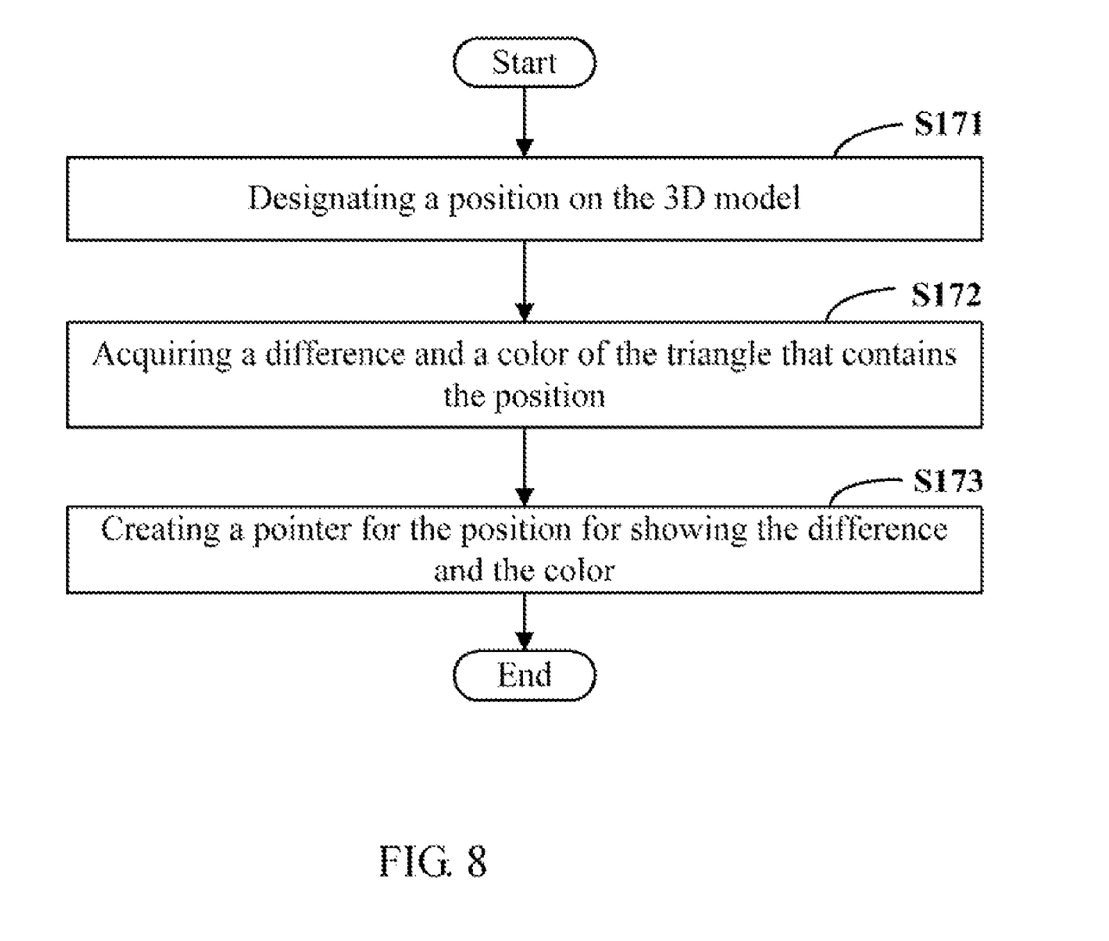
FIG. 8 is a detailed description of another block in FIG. 2 of one embodiment of a method for creating a pointer for each position on the 3D model.

FIG. 8 is a detailed description of block S17 in FIG. 2 of one embodiment of a method for creating a pointer for each position on the 3D model. Depending on the embodiment, in FIG. 8, additional blocks may be added, others removed, and the ordering of the blocks may be changed.

In block S171, the pointing module 170 designates a position on the 3D model discretionarily.

In block S172, the pointing module 170 acquires a difference and a color of the triangle that contains the position.

In block S173, the pointing module 170 creates a pointer of the position for referring directly to (or "pointing to") the difference and the color of the position using address.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for measuring a three-dimensional object, the system comprising:
 a scanning module configured for controlling a laser scanning device to scan all surfaces of the object for obtaining a point cloud for each of the surfaces of the object;
 a processing module configured for obtaining an integrated point cloud of the object;
 a reading module configured for reading a three-dimensional (3D) model of the object from a database system;
 an adjusting module configured for determining a normal vector to each surface of the 3D model, and further configured for adjusting the normal vectors so as to align the normal vectors to have the same orientation, wherein the adjusting is done by using a method of adjusting normal vectors automatically or by using a method of adjusting normal vectors by designating positions, the method of adjusting normal vectors automatically comprising:
  (d1) determining a base surface from the surfaces of the 3D model and presetting a distance tolerance;
  (d2) determining boundaries of the base surface and the other surfaces of the 3D model;
  (d3) determining intersecting surfaces between the base surface and the other surfaces of the 3D model according to the distance tolerance and the boundaries;
  (d4) selecting the intersecting surfaces whose normal vectors are the same as the normal vector of the base surface; and
  (d5) adjusting the normal vectors of the selected intersecting surfaces;
 an aligning module configured for aligning the integrated point cloud with the 3D model;
 a contrasting module configured for contrasting the integrated point cloud and the 3D model, and highlighting differences between the integrated point cloud and the 3D model by assigning different colors on the 3D model; and
 at least one processor configured for executing the scanning module, the processing module, the reading module, the adjusting module, the aligning module, and the contrasting module.

2. The system as described in claim 1, further comprising:
 a pointing module configured for creating a pointer for each position on the 3D model for showing a difference and a color of the each position when the each position is created.

3. The system as described in claim 1, wherein the integrated point cloud of the object is a combination of the point cloud for each surface of the object.

4. The system as described in claim 1, wherein the normal vector is inside or outside a respective surface of the 3D model.

5. A computer-based method for measuring a three-dimensional object, the method comprising:
 (a) scanning all surfaces of the object for obtaining a point cloud for each of the surfaces;
 (b) obtaining an integrated point cloud of the object by processing the point clouds;
 (c) reading a 3D model of the object from a database system;
 (d) determining a normal vector to each surface of the 3D model, and adjusting normal vectors so as to align the normal vectors have the same orientation, wherein the adjusting is done by using a method of adjusting normal vectors automatically or by using a method of adjusting normal vectors by designating positions, the method of adjusting normal vectors automatically comprising:
  (d1) determining a base surface from the surfaces of the 3D model and presetting a distance tolerance;
  (d2) determining boundaries of the base surface and the other surfaces of the 3D model;
  (d3) determining intersecting surfaces between the base surface and the other surfaces of the 3D model according to the distance tolerance and the boundaries;
  (d4) selecting the intersecting surfaces whose normal vectors are the same as the normal vector of the base surface; and
  (d5) adjusting the normal vectors of the selected intersecting surfaces;
 (e) aligning the integrated point cloud with the 3D model; and
 (f) contrasting the integrated point cloud and the 3D model, and highlighting differences between the integrated point cloud and the 3D model by assigning different colors on the 3D model.

6. The method as described in claim 5, further comprising:
 creating a pointer for each position on the 3D model for showing a difference and a color of the each position when the each position is created.

7. The method as described in claim 5, wherein block (b) comprises:
   arranging the point clouds together according to an appearance of the object;
   deleting overlapping points among the point clouds;
   deleting noise points from the point cloud;
   yielding uniformly distributed point clouds by filtering; and
   integrating the point clouds for generating an integrated point cloud of the object.

8. The method as described in claim 5, wherein the method of adjusting normal vectors by designating positions comprises:
   determining surfaces whose normal vectors need to be adjusted from the surfaces of the 3D model;
   meshing the determined surfaces with a series of triangles;
   designating a position on the determined surfaces;
   determining an uppermost layer triangle that contains the position from the series of triangles;
   computing an angle between a vector of the uppermost layer triangle and a current visual angle of a screen of the computer;
   obtaining a surface that contains the uppermost layer triangle upon the condition that the angle is more than 90 degree; and
   adjusting the normal vector of the obtained surface by reversing points of the boundary of the obtained surface.

9. The method as described in claim 5, wherein block (e) comprises:
   superposing a center point of the integrated point cloud with a center of the 3D model by moving the integrated point cloud;
   determining several points from the integrated point cloud, and computing a approximate site using an iterative method according to the several points;
   computing an accurate site using the iterative method, according to the approximate site and all points in the integrated point cloud; and
   rotating and translating the integrated point cloud to the accurate site.

10. The method as described in claim 5, wherein block (f) comprises:
    meshing all the surfaces of the 3D model with a series of triangles;
    computing a difference between each of the points in the integrated point cloud and a corresponding triangle of the surfaces of the 3D model;
    presetting a plurality of difference ranges and presetting a unique color for each of the difference ranges; and
    highlighting the triangles using different colors according to the difference ranges.

11. A non-transitory computer-readable medium having stored thereon instructions that, when executed by a computer, causing the computer to perform a method for measuring a three-dimensional object, the method comprising:
    (a) scanning all surfaces of the object for obtaining a point cloud for each of the surfaces;
    (b) obtaining an integrated point cloud of the object by processing the point clouds;
    (c) reading a 3D model of the object from a database system;
    (d) determining a normal vector to each surface of the 3D model, and adjusting normal vectors so as to align the normal vectors have the same orientation, wherein the adjusting is done by using a method of adjusting normal vectors automatically or by using a method of adjusting normal vectors by designating positions, the method of adjusting normal vectors automatically comprising:
        (d1) determining a base surface from the surfaces of the 3D model and presetting a distance tolerance;
        (d12) determining boundaries of the base surface and the other surfaces of the 3D model;
        (d13) determining intersecting surfaces between the base surface and the other surfaces of the 3D model according to the distance tolerance and the boundaries;
        (d4) selecting the intersecting surfaces whose normal vectors are the same as the normal vector of the base surface; and
        (d5) adjusting the normal vectors of the selected intersecting surfaces;
    (e) aligning the integrated point cloud with the 3D model; and
    (f) contrasting the integrated point cloud and the 3D model, and highlighting differences between the integrated point cloud and the 3D model by assigning different colors on the 3D model.

12. The non-transitory computer-readable medium as described in claim 11, wherein the method further comprises:
    creating a pointer for each position on the 3D model for showing a difference and a color of the each position when the each position is designated.

13. The non-transitory computer-readable medium as described in claim 11, wherein block (b) comprises:
    arranging the point clouds together according to an appearance of the object;
    deleting overlapping points among the point clouds;
    deleting noise points from the point cloud;
    yielding uniformly distributed point clouds by filtering; and
    integrating the point clouds for generating an integrated point cloud of the object.

14. The non-transitory computer-readable medium as described in claim 11, wherein the method of adjusting normal vectors by designating positions comprises:
    determining surfaces whose normal vectors need to be adjusted from the surfaces of the 3D model;
    meshing the determined surfaces with a series of triangles;
    designating a position on the determined surfaces;
    determining an uppermost layer triangle that contains the position from the series of triangles;
    computing an angle between a vector of the uppermost layer triangle and a current visual angle of a screen of the computer;
    obtaining the surface that contains the uppermost layer triangle upon the condition that the angle is more than 90 degree; and
    adjusting the normal vector of the obtained surface by reversing points of the boundary of the obtained surface.

15. The non-transitory computer-readable medium as described in claim 11, wherein block (e) comprises:
    superposing a center point of the integrated point cloud with a center of the 3D model by moving the integrated point cloud;
    determining several points from the integrated point cloud, and computing a approximate site using an iterative method according to the several points;
    computing an accurate site using the iterative method, according to the approximate site and all points in the integrated point cloud; and
    rotating and translating the integrated point cloud to the accurate site.

16. The non-transitory computer-readable medium as described in claim 11, wherein block (f) comprises:
   meshing all the surfaces of the 3D model with a series of triangles;
   computing a difference between each of the points in the integrated point cloud and a corresponding triangle of the surfaces of the 3D model;
   presetting a plurality of difference ranges and presetting a unique color for each of the difference ranges; and
   highlighting the triangles using different colors according to the difference ranges.

* * * * *